United States Patent
Dallmeier

(10) Patent No.: US 7,001,219 B2
(45) Date of Patent: Feb. 21, 2006

(54) REPLACEABLE DEVICE FOR AN ELECTRONIC MONITORING SYSTEM, ESPECIALLY A VIDEO MONITORING SYSTEM

(75) Inventor: Dieter Dallmeier, Pettendorf (DE)

(73) Assignee: Dallmeier Electronic GmbH & Co. KG., Regensburg (DE)

( * ) Notice: Subject to any disclaimer, the term of this patent is extended or adjusted under 35 U.S.C. 154(b) by 0 days.

(21) Appl. No.: 10/614,107

(22) Filed: Jul. 8, 2003

(65) Prior Publication Data

US 2004/0137788 A1    Jul. 15, 2004

(30) Foreign Application Priority Data

Aug. 16, 2002   (DE) ............................... 102 38 333

(51) Int. Cl.
    *H01R 25/00*    (2006.01)
(52) U.S. Cl. .................... 439/638; 439/135; 439/489
(58) Field of Classification Search ............... 439/638, 439/136, 489, 135
    See application file for complete search history.

(56) References Cited

U.S. PATENT DOCUMENTS

| | | | | |
|---|---|---|---|---|
| 5,452,951 A | * | 9/1995 | Peller ......................... | 312/310 |
| 5,549,139 A | * | 8/1996 | Perkins et al. .............. | 137/884 |
| 5,560,114 A | * | 10/1996 | Lahteenmaki ................ | 33/356 |
| 5,816,859 A | * | 10/1998 | Dubin et al. ................. | 439/638 |
| 5,921,816 A | * | 7/1999 | Larabell ..................... | 439/638 |
| 6,208,612 B1 | * | 3/2001 | Miller ..................... | 369/30.19 |
| 6,266,248 B1 | * | 7/2001 | Hanas et al. ................ | 361/752 |
| 6,483,709 B1 | * | 11/2002 | Layton ....................... | 361/724 |

* cited by examiner

*Primary Examiner*—Truc Nguyen
(74) *Attorney, Agent, or Firm*—Hoffman, Wasson & Gitler P.C.

(57) ABSTRACT

The invention refers to a new type of device for an electronic monitoring system, especially for a video monitoring system, with a casing and with at least one connection field containing a plurality of single connections on one casing side. The connection field is provided on a removable segment.

8 Claims, 6 Drawing Sheets

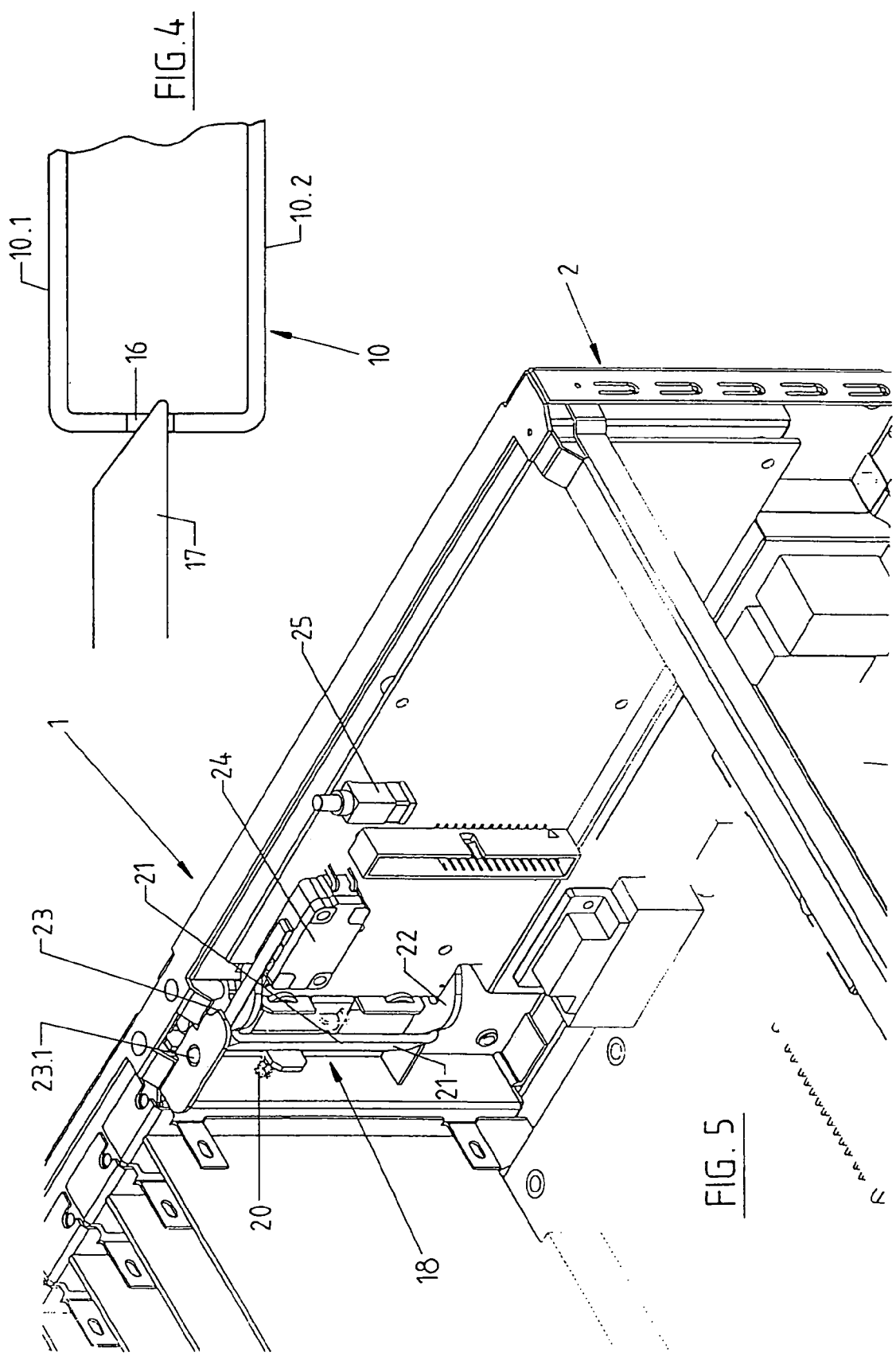

REPLACEABLE DEVICE FOR AN ELECTRONIC MONITORING SYSTEM, ESPECIALLY A VIDEO MONITORING SYSTEM

BACKGROUND OF THE INVENTION

The invention refers to a replacement device for an electronic monitoring system and especially a replacement device for a video monitoring system. The monitoring system has a removable segment of a casing wall with a connection field having a plurality of individual connections. The removable segment is detachable when the monitoring system fails.

Monitoring systems, in particular such systems with a plurality of sensors, detectors, or video cameras for monitoring objects, are known in a wide variety of models. In particular, devices are known for such systems that have a plurality of external connections on one side of a casing and thereby preferably on the back of this casing, forming a connection field on which a plurality of external sensors, detectors and/or cameras can be connected. The configuration of the external connections is always freely selectable and generally is based on a desired or defined monitoring program, in which the selected configuration is taken into account.

Should it become necessary to replace the respective device due to a defect or required maintenance, etc. with another device, then it was, up until now, necessary to disconnect all lines connected to the external connections from these connections and after replacement of the device to reconnect these connections according to the original configuration of the connections. This is not only time-consuming, but can also result in considerable errors.

The object of the invention is to present a device that prevents these disadvantages.

To achieve this object, a replaceable device with a connection field is provided.

SUMMARY OF THE INVENTION

In the device according to the present invention, the external connections of the connection field, which include, at least partly, connections for coax cables, are located on the removable segment, which in turn is connected with the device by means of separable electric multiple connections in the form of multiple plugs and corresponding sockets. Within this segment the external connections are connected permanently with the connections of at least one electric multiple connection element (multiple plug or multiple socket) of the segment, such that by means of this multiple connection element of the segment, a specific permanent allocation of each external connection of the connection field exists with an internal input or output internal to the device.

When replacing the device, only that segment which is part of the casing wall, for example part of the casing back, is removed from the casing, retaining the connections with the external connections. After replacing the device, the segment is fastened to the new device, whereby by means of the segment-side and device-side multiple connections all external sensors, detectors, cameras, etc. are connected with the correct inputs of the device.

The segment can be manufactured with a very flat form, so that practically no additional space is needed for this segment.

BRIEF DESCRIPTION OF THE DRAWINGS

The invention is described in more detail below based on the drawings using sample embodiments.

FIG. 4 shows a very simplified representation of a catch for the segment of the casing back;

FIG. 5 shows a partial representation in perspective view of the opened casing in a view of the inner surface of the casing back in the area of the back wall segment.

DETAILED DESCRIPTION OF THE INVENTION

Figure 1:
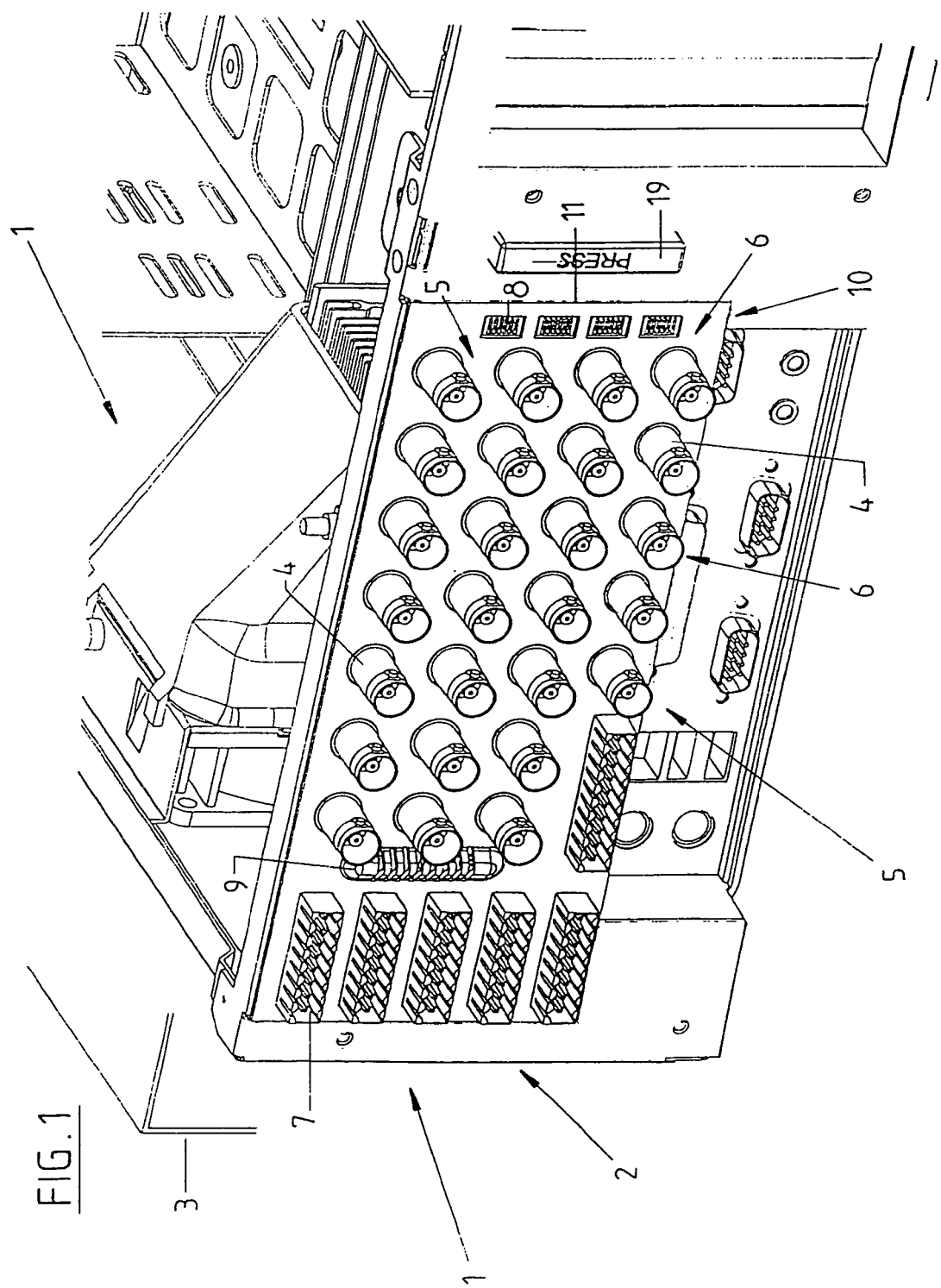
FIGS. 1–3 each show a perspective representation of the back of the opened casing of a device for video monitoring, in various states of the segment of the casing back designed as an adapter.

In the drawings, 1 refers to a device that is part of an electronic video monitoring system, which has a plurality of monitoring cameras (video cameras) and with which one or more objects can be monitored. The device 1 serves, for example, in the simplest case to convert the video signals provided by the individual cameras in real-time monitoring into digital signals and to save them, for example, in suitable storage media of the device or other, additional devices, or for certain monitoring functions, to compare the current image recorded by a video camera with already existing images from the same camera, etc. Other complex functions are also conceivable for the device 1 and possibly for other devices of the system in connection with this device.

The functional elements of the device 1 are accommodated in a flat rectangular casing 2, which is similar to the casing of a computer, or PC, and is depicted in FIGS. 1–4 in open condition. For the practical use of the device 1, the casing 2 is closed by means of a casing element made of flat material, for example, of bent sheet steel, as indicated by 3 in FIG. 1.

Figure 2:
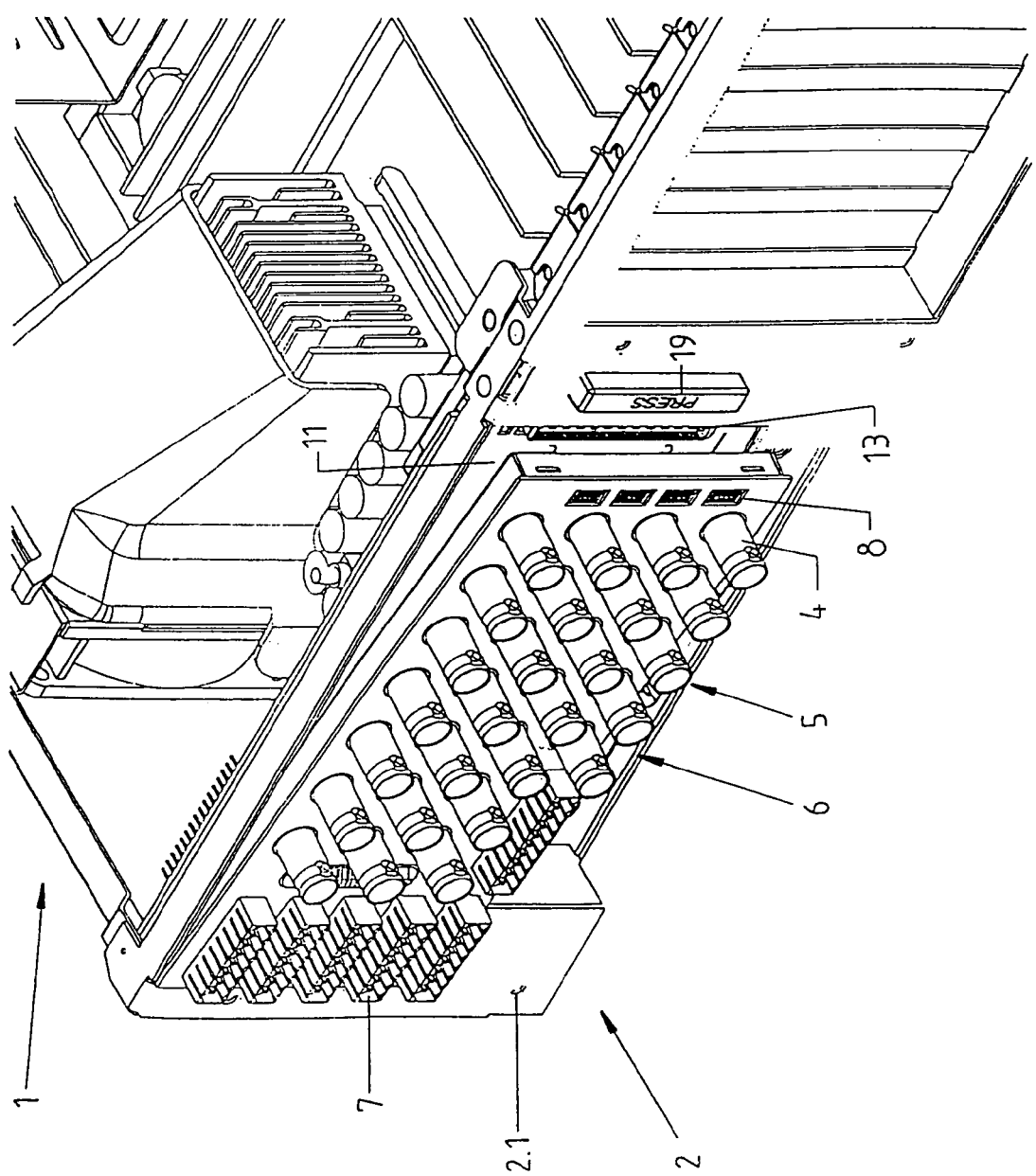
Figure 3:
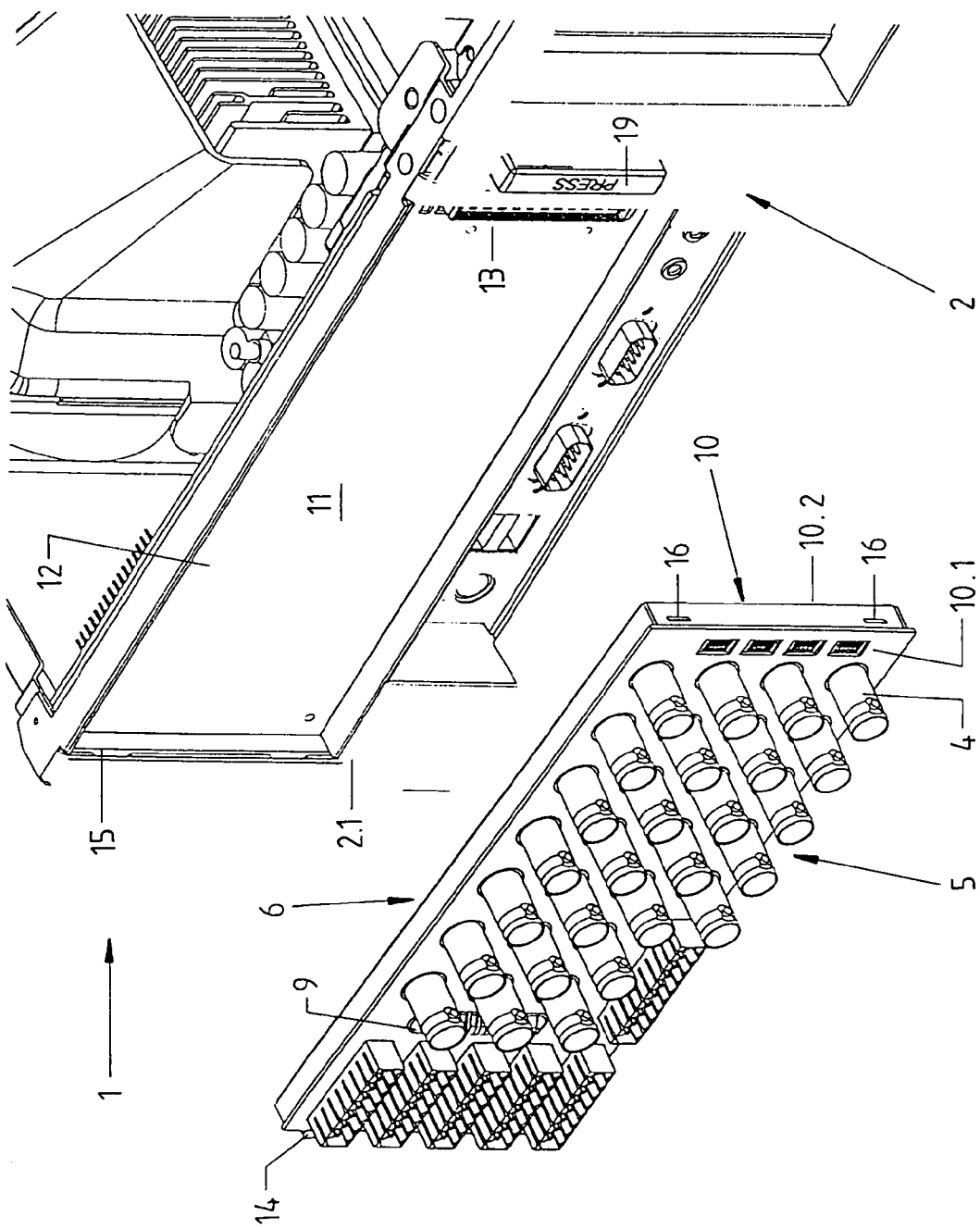

FIGS. 1–3 show a rear view of the casing 2. On the back 2.1 of the casing 2 there are various connections, in particular a plurality of connections 4 in the form of BNC sockets, to which a video camera can be connected by means of a corresponding BNC connection plug and a coax cable. In the depicted embodiment, the connections 4 form a connection field 5 with a total of twenty-six connections 4, which are individually configured for the corresponding cameras. A special feature of the device 1 consists in the fact that the connections 4 constituting the connection field 5 for the cameras are located on a segment 6 of the back of the casing 2.1, together with additional connections 7 and 8 for multiple plugs or sockets and with a sensor configuration 9, which contains at least one air temperature and/or humidity sensor. The casing segment 6 forms a flat, plate-shaped casing 10, which in the condition depicted in FIG. 1 is accommodated and locked in a recess 11 on the back 2.1 of the casing 2, such that the surface 10.1 of the flat casing 10 accommodating the connection field 5 is in a plane or essentially in a plane with the remaining back 2.1 of the casing and the other surface 10.2 of the flat casing 10 is adjacent to a casing wall 12, which closes the recess 11 toward the inside of the casing 2.

On the side 10.2 facing away from the connection field 5 there are multiple connection elements (multiple plugs or sockets), which work together with the corresponding connection elements on the casing dividing wall 12. For the sake of simplification, only one such multiple connection element is depicted in the drawings, in the form of a multiple socket 13. Essentially, several such multiple connection elements can be provided for on the casing dividing wall 12, in which case they work together with a corresponding connection element on the back 10.2 of the casing 10.

Within the casing 10 there is a permanent wiring or electrical connection between the connections 7 and 8 and the multiple connections on the back 10.2 of the casing 10 that work together with the multiple connections 13 on the casing dividing wall, in particular one permanent connection between the connections 4 and these multiple connections on the back 10.2 of the casing, so that inside the device each connection 4 is permanently allocated to a particular connection or input of the multiple connection 13. Also the at least one sensor of the sensor configuration 9 is connected with the electronic circuitry of the device 1 by means of a connection on the back 10.2 of the casing 10 that works together with a multiple connection 13.

As depicted in FIGS. 2 and 3, the segment 6 can initially be removed by swiveling (FIG. 2) and then lifting (FIG. 3) it from the casing 2. For this purpose, the segment 6, rectangular when viewed from the top and the longer sides of which are parallel to the top and bottom of the casing 2 in the recess 11, is provided on one narrow side, i.e. in the depiction in FIGS. 1–3 on the left narrow side furthest from the multiple connection element 13, on which (narrow side) the connections 7 are primarily located, with two brackets 14 extending beyond this narrow side, each of which engages in an opening 15 of the device for a segment 6 held on the casing 2. On the narrow side opposite the brackets 14 the casing 10 is provided with two openings 16, into which a spring-mounted catch 17 of a locking and unlocking mechanism 18 engages for a segment fastened on the casing back, as represented very schematically in FIG. 4.

The locking and unlocking mechanism 18 has, for example, a push button 19 that is accessible on the outside of the casing back 2.1 and that can be activated against the effect of a pull-back spring 20, for swiveling an ejector 21 such that not only the two catches 17 are unlocked from the corresponding opening 16, but at the same time also swivel arms 22 of the ejector 21 come to bear against the back 10.2, in the vicinity of the narrow side of the casing 10 with the openings 16 and in the direct vicinity above and below the contacts there that work together with the multiple contact 13, so that when the push button 19 is pushed, the segment 6 is unlocked and swivels on an axis parallel to the narrow side with the brackets 14, such that a separation between the multiple contacts 13 and the corresponding multiple contacts on the back 10.2 takes place (FIG. 2) and then by pulling out the brackets 14 from the respective holders 15 the complete separation of the segment 6 from the casing 2 is possible.

This embodiment features the advantage that in the event of a defect in the device 1, this device can be replaced, without disconnecting the connections at the connections 7 and 8, and especially at the connections 4.

The connections 4 can be configured freely. However, the connections are to be configured accordingly before the initial startup of the system and the configuration is to be taken into account when programming the overall system. Upon disconnection of the electrical connections at the connections 4 when replacing the device 1, it would normally be very time-consuming to restore the connections to the plurality of cameras in the original configuration. In the depicted embodiment, the device 1 is replaced by an equivalent device in such a way that, retaining all external connections with the connections 4, 7 and 8, the segment 6 is removed from a device and docked onto the new device, so that the configuration of the connections is automatically retained despite replacement of the device.

The top 3 is fastened in the conventional manner using screws. For this purpose, the fastening brackets 23 on the casing 2 are provided with threads. In order to prevent unauthorized opening of the casing 2 and therefore manipulations within the casing 2, several sabotage switches 24 and 25 are provided for, with at least one sabotage switch 24, which monitors the existence of a fastening screw in the bore hole 23.1 of the fastening bracket 23 by means of a mechanical switch arm 24.1 and sends a signal upon removal of this fastening screw, triggering an acoustic and/or visual alarm at the monitoring system, for example at the central control panel of this system.

Additional sabotage switches 25 are provided for between the fastening points of the top 3 on the casing 2. These sabotage switches 25 in the depicted embodiment are designed as calipers and bear with one switch element 25.1 against the inner surface of the top 3 in such a way that an alarm signal is likewise produced if the top 3 is removed or lifted.

Figure 6:
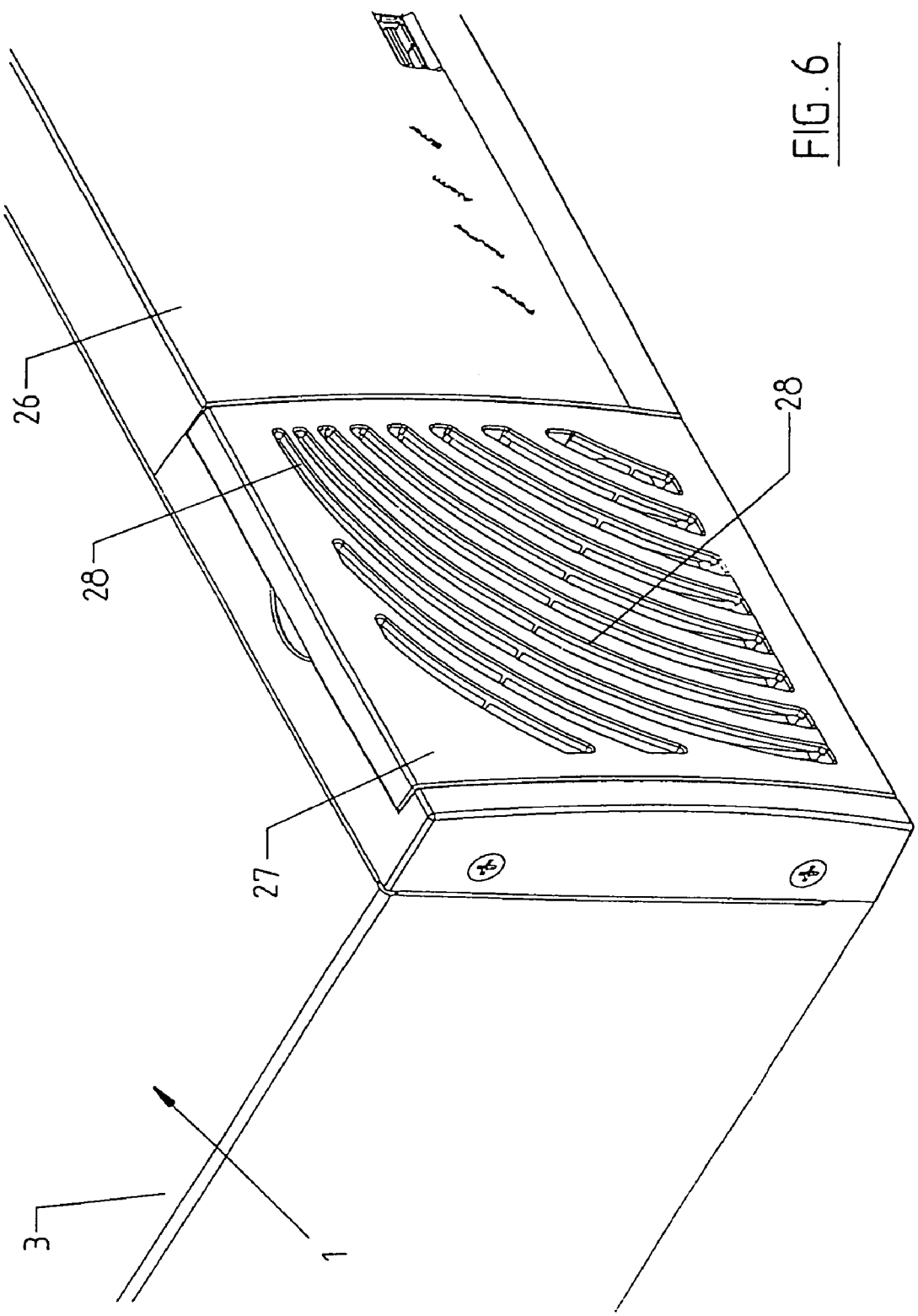
FIGS. 6 and 7 show a partial representation in perspective view of the front of the casing in the area of a ventilation opening with a hinged screen for changing an air filter, with the screen closed (FIG. 6) and the screen open (FIG. 7).
Figure 7:
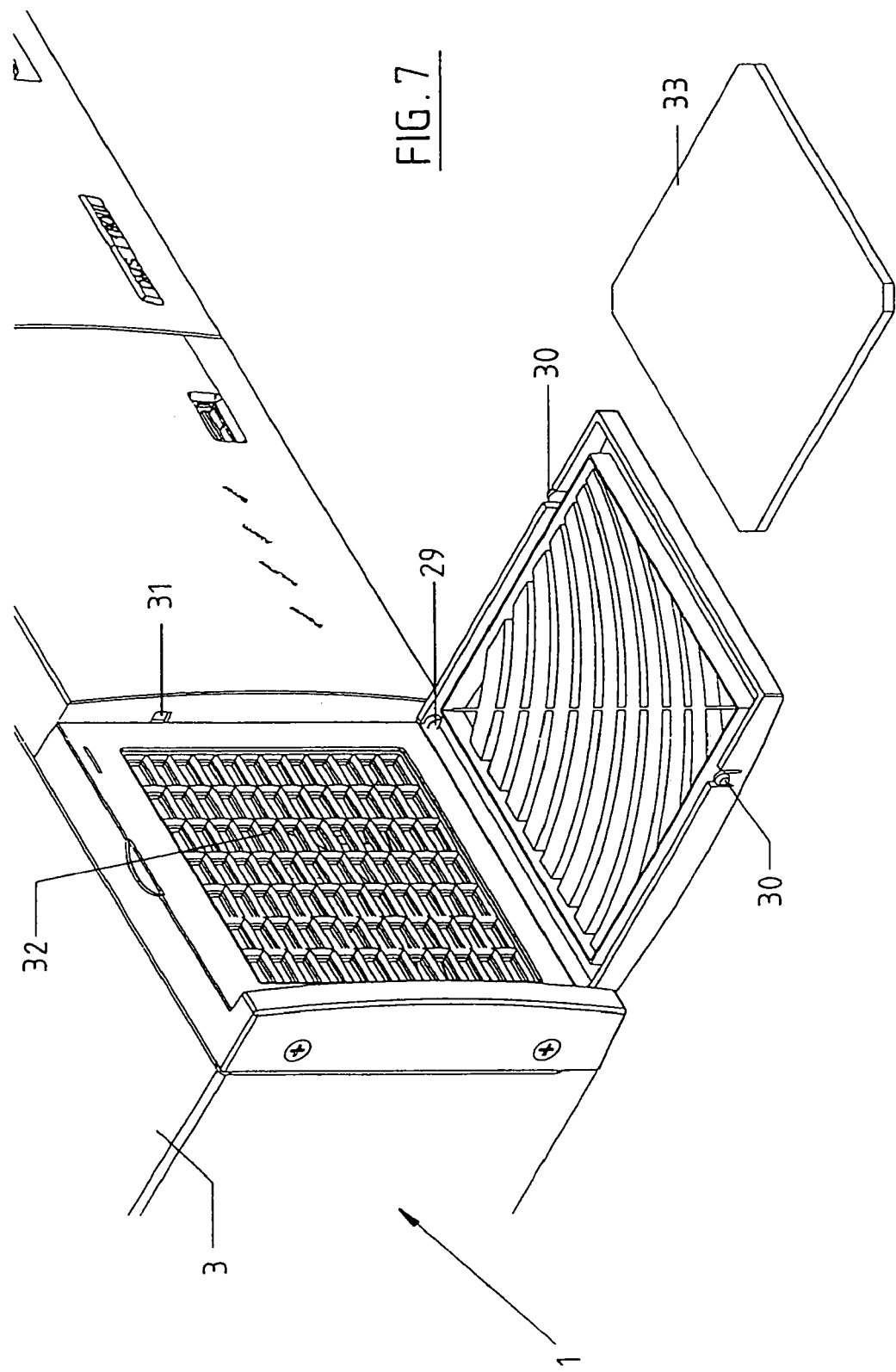

FIGS. 6 and 7 show the front side 2.2 of the casing 2. This front side, on which various displays and other functional elements of the device 1 are located, is made of a molded section 26 of plastic in the depicted embodiment. This front section 26 is provided with a screen 27 with ventilation slots 28, also in the form of a molded section made of plastic. The screen 27 is held onto the front section 26 by means of molded journals 29 and can swivel on an axis parallel to the bottom of the casing 2. Furthermore, the screen 27 is provided with molded catches 30, which lock into counter-catches 31 on the front section 26 when the screen is closed, so that the outer surface of the closed screen 27 forms the continuation of the outer surface of the front section 26.

Behind the screen 27 the front section 26 forms a ventilation opening 33 with a grid-like structure, such that between this grid-like structure and the closed screen 27 there is space for accommodating a replaceable air filter 33 made of a flat filter material. This design makes it possible to easily replace the air filter 33 if necessary, in particular without opening the device 1 and without removing this device from the overall system.

The invention was described above based on a sample embodiment. It goes without saying that numerous modifications and variations are possible without abandoning the underlying inventive idea of the invention.

REFERENCE SYMBOLS

1 Device
2 Casing
2.1 Casing back
2.2 Casing front
3 Casing top
4 Connection for video camera
5 Connection field
6 Casing segment
7, 8 Connection
9 Sensor configuration
10 Casing of segment
10.1 Casing front
10.2 Casing back
11 Recess
12 Casing wall
13 Multiple connection 14 Bracket
15 Opening
16 Opening
17 Catch
18 Locking and unlocking mechanism
19 Push button
20 Spring
21 Ejector
22 Swivel arm
23 Fastening bracket
23.1 Threaded hole
24, 25 Sabotage switch
26 Front section of casing
27 Screen
28 Ventilation opening
29 Swivel pin
30 Catch
31 Counter-catch
32 Ventilation opening with grid structure

What is claimed is:

1. An electronic video monitoring system, comprising
a monitoring device having at least one external connection field and a casing,
said external connection field having a plurality of external individual connections each for connecting one camera with the device,
said external connection field being provided for on a flat plate-shaped segment housing,
the segment housing being removably fastened in a recess of said casing of the monitoring device and forming part of the outer surface of said casing,
a plurality of video cameras connected with said monitoring device via video lines,
internal multiple contacts on the segment housing,
the internal multiple contacts being disconnectably connected to at least one multiple connection on the casing of the monitoring device,
said external individual connections being electrically connected with the internal multiple contacts on the segment housing,
said recess being closed at its bottom by a bottom wall inside of the casing,
said at least one multiple connection being provided on said bottom wall inside the recess, and
said internal multiple contacts on the segment housing and said at least one multiple connection on the bottom wall inside the recess being multiple plugs and multiple sockets connections.

2. The video monitoring system according to claim 1, wherein
the segment housing is provided with brackets extending beyond
a first narrow side of the segment housing which side is opposite to second narrow aide of the segment housing, and said internal multiple contacts on the segment housing are provided near the second narrow side of the segment housing, each of said brackets engage an opening of the casing when the segment housing is located inside the recess of the device casing,
the casing has a locking and unlocking mechanism with a spring mounted catch for locking the segment housing in the recess of the casing.

3. The video monitoring system according to claim 1, wherein the external individual connections of the external connection field are electrically connected with the internal multiple contacts on the segment housing by means of wires or strip conductors inside the flat segment housing.

4. The video monitoring system according to claim 1, wherein the individual external connections are BNC-sockets.

5. The video monitoring system according to claim 1, wherein the segment housing with the external connection field is located on a back side of the casing of the device.

6. The video monitoring system according to claim 1, further comprising on the front side of the casing a ventilation opening with a replaceable air filter.

7. The video monitoring system as claimed in claim 1, wherein an interior of the casing of the device is closed by at least one removable casing element and further comprising at least one sabotage sensor or sabotage switch provided for on the casing that send a signal upon opening top and/or upon lifting the top from the reminding casing to create a visual alarm, and acoustic alarm or both,
said at least one sabotage switch monitoring a screw for fastening the top of the casing to the remaining casing or monitoring the top of the casing in between fastening points of the top on the casing.

8. An electronic video monitoring system comprising
a plurality of video cameras connected with a monitoring device via video lines,
said monitoring device having at least one external connection field,
said external connection field having a plurality of external individual connections each for connecting one camera with the device,
said external connection field being provided for on a flat plate-shaped segment housing,
the segment housing being removable fasted in a recess of a casing of the monitoring device and thereby forms part of the outer surface of said casing,
internal multiple contacts being provided for on the segment housing,
the internal multiple contacts being disconnectably connected to at least one multiple connection on the casing of the monitoring device,
said external individual connections being electrically connected with the internal multiple contacts on the segment housing,
said recess being closed at its bottom by a bottom wall inside of the casing,
said at least one multiple connection being provided on said bottom wall inside the recess, and
said internal multiple contacts on the segment housing and said at least one multiple connection on the bottom wall inside the recess being multiple plugs and multiple sockets connections,
the segment housing being provided for with brackets extending beyond a first narrow side of the segment housing which side is opposite to second narrow side of the segment housing,
said internal multiple contacts on the segment housing being provided for near the second narrow side of the segment housing,
each of said brackets engaging an opening of the device casing when the segment housing is located inside the recess of the device casing, and
the device casing having a locking and unlocking mechanism with a spring mounted catch on for locking the segment housing in the recess of the casing.

* * * * *